No. 840,673. PATENTED JAN. 8, 1907.
J. A. WARD.
ANIMAL TRAP.
APPLICATION FILED FEB. 21, 1906.
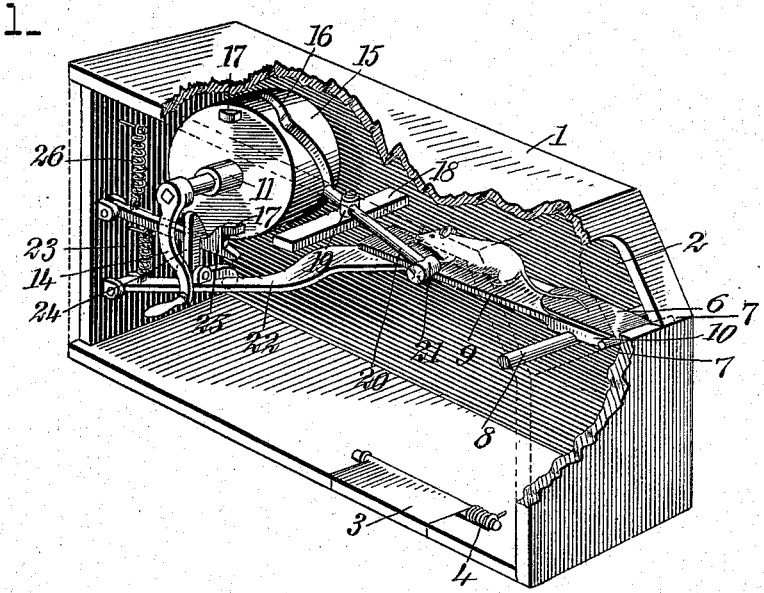
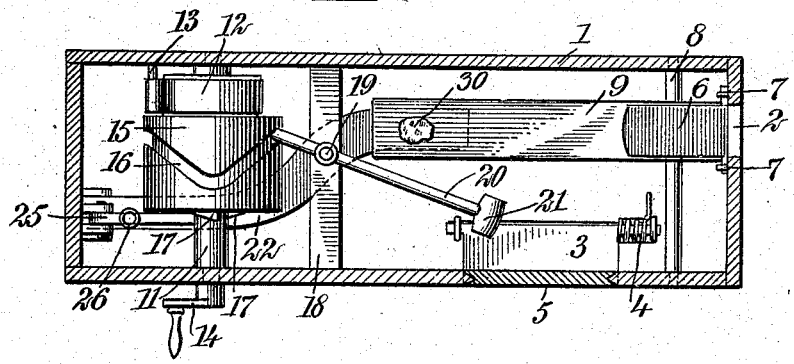
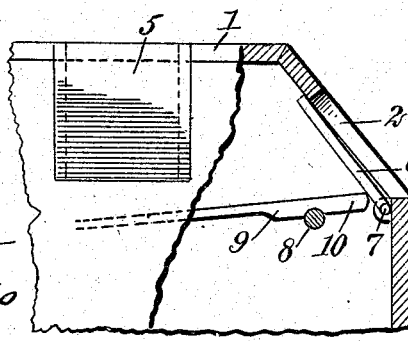
WITNESSES:
INVENTOR
John A. Ward
BY Munn & Co.
ATTORNEYS

UNITED STATES PATENT OFFICE.

JOHN ALBERT WARD, OF NOWATA, INDIAN TERRITORY.

ANIMAL-TRAP.

No. 840,673.　　　　　Specification of Letters Patent.　　　　　Patented Jan. 8, 1907.

Application filed February 21, 1906. Serial No. 302,201.

*To all whom it may concern:*

Be it known that I, JOHN ALBERT WARD, a citizen of the United States, and a resident of Nowata, District 3, Indian Territory, have invented a new and Improved Animal-Trap, of which the following is a full, clear, and exact description.

My invention relates to improvements in a device adapted to kill undesirable animals and birds, such as mice and sparrows, and in particular to a device which will operate to kill a number of animals or birds, as the case may be, and which will automatically reset itself after each operation and eject the victim in order to prevent its interference with the subsequent operation of the device.

The object of my invention is to provide a device of this character at a small cost which will be simple and reliable and which when properly supplied with power and baited will automatically operate and reset itself without any attendance whatever until the power is exhausted, when it will be merely necessary to supply the device with additional power—such, for example, as the winding of a spring.

With these objects in view I have shown in the accompanying drawings the construction of a device embodying the principles of my invention, in which similar characters of reference indicate corresponding parts in all the figures.

Figure 1 is a perspective view of the complete device, part of the casing being broken away to show the mechanism contained therein. Fig. 2 is a plan view, the cover being removed, and Fig. 3 is a fragmentary elevation with part of the casing in section and being on an enlarged scale.

Referring now to the drawings in detail, 1 represents a convenient box or casing for the mechanism of the trap and which is provided with a suitable doorway 2, through which the animal or bird may enter. There is also a trap-door 3 in the bottom of the casing, which may be normally held in a closed position by a spiral spring 4. I find it convenient also to provide a sliding door 5 in the side of the casing in order to afford an easy means to attend to the bait or adjust the mechanism. At the lower edge of the doorway 2 is a door 6, which is pivoted at 7. Extending from side to side of the casing 1 is a pin or pivot 8, upon which oscillates a tread 9, the arrangement being such that when the longer arm of this tread is slightly raised the door 6 will fall to a substantially horizontal position and be nearly parallel with the tread 9, as shown in Fig. 1; but when the long arm is slightly depressed the short arm 10 thereof will close the door 6, as clearly shown in Fig. 3. The operating mechanism is here shown as consisting of a shaft 11, journaled in the sides of the casing, to which is secured one end of a spiral spring 12, the other end thereof being secured to the casing by a pin 13, and this spring may be put under tension by rotating the shaft 11 by a crank or key 14. Keyed upon this shaft is a cylinder 15, having a cam-groove 16 around its periphery and also having on one end a plurality of detents or bevel-stops 17. Parallel to the shaft 11 is a bar 18, upon which is pivoted at 19 an oscillating striker-arm 20, the shorter end of which works in the cam-groove 16, and the longer arm of which is provided with means to aid in killing the animal—as, for instance, a hammer 21. This last-mentioned member is positioned to sweep over and above the tread 9, as clearly shown in Fig. 1.

The tripping mechanism consists of a pivoted arm 22, the free end of which rests normally under the longer arm of the tread 9 and which is held in engagement therewith by a weak spiral spring 23 near its pivotal support, and this arm 22 carries a right-angular pivoted bayonet-catch 24, which coacts with a short trigger-arm 25, the free end of which coöperates with the stops 17, as shown in Fig. 1. This arm 25 is also provided with a weak spiral spring 26 near its pivotal support.

From the foregoing the operation of my trap will be easily understood. Upon a rotation of the shaft 11 by the crank 14 the spring 12 is put under tension and the trigger 25, by coacting with the stops 17, retains the spring under the desired tension. The catch 24 is held by the trigger 25, and thereby raises the arm 22 into contact with the tread 9, which latter is substantially horizontal, and the trap is set and ready for operation, as shown in Fig. 1.

When an animal or bird enters the doorway 2 and travels inwardly along the tread 9 to obtain the bait 30, the longer arm of the tread is depressed, and thereby lowers the free end of the arm 22, together with its bayonet-catch 24, which in turn frees the trigger 25 from the stops 17 by pulling said trigger downward and permits a rapid rotation of the cylinder. As this cylinder rotates the cam-groove 16 actuates the pivoted striker 20, which kills the animal, it being noticed that the door 6 is automatically closed as the tread 9 is depressed, as shown in Fig. 3. When the dead animal drops from the tread 9, the same is elevated to a substantially horizontal position and the trigger 25, together with the catch 24 and arm 22, are raised by the small spiral springs 23 and 26 and the cylinder 15 is arrested by the next stop 17 coming in contact with the trigger 25, and the trap is thus automatically reset and ready for subsequent operation. It is obvious that the trap will continue to operate as often as an animal enters on the tread 9 and that it will automatically reset itself until the spring 12 is unwound, when it will be merely necessary to rewind the same by the crank 14.

Having thus described my invention, I claim as new and desire to secure by Letters Patent—

1. In an animal-trap, the combination of a pivoted tread, a cam, a spring for actuating the cam, a striker-arm actuated by the cam, a trigger for normally restraining the movement of the cam, and releasing means for said trigger actuated by the tread.

2. In an animal-trap, the combination of a tread, a pivoted striker-arm movable thereupon, a normally operative cam device for actuating the arm, means for restraining the operation of the cam device, and means whereby the tread may release said restraining means.

3. In an animal-trap, the combination of a spring-actuated cylinder having a cam-groove, a trigger coacting therewith, tripping mechanism, and a striker-arm operable by the cam.

4. In an animal-trap, the combination of a cam, a striker-arm actuated by the cam, means for operating the cam, means for normally restraining the operation of the cam, and a tripping device for releasing the restraining device.

5. In an animal-trap, the combination of a cam-cylinder having a plurality of stops, means for rotating the cam-cylinder, a pivoted trigger-arm coacting with the stops for restraining the movement of the cam, a striker-arm operated by the cam, and a latch for releasing the trigger-arm.

6. In an animal-trap, the combination of a spring-actuated cam-cylinder having a plurality of stops, a pivoted striker-arm operated by the cam-cylinder, a pivoted spring-pressed trigger coacting with the stops for normally restraining the movement of the cam, and a pivoted latch for releasing the trigger.

7. In an animal-trap, the combination of a pivoted tread, a pivoted door coacting therewith, a spring-actuated cam-cylinder provided with stops, a pivoted striker-arm coacting with said cam-cylinder, a trigger coacting with said stops, and a pivoted arm having a catch coacting with said tread and said trigger substantially as, and for the purpose specified.

In testimony whereof I have signed my name to this specification in the presence of two subscribing witnesses.

JOHN ALBERT WARD.

Witnesses:
C. L. BECKLEY,
J. MANGAN.